Aug. 2, 1966        P. LAMORLETTE        3,264,504
ELECTRICAL GENERATOR AND DEVICES FOR SUPPLYING ELECTRIC
CURRENT TO LIGHTING, AIR-CONDITIONING
AND OTHER APPARATUS
Filed June 2, 1961        5 Sheets-Sheet 1

INVENTOR:
PAUL LAMORLETTE
BY: NOLTE AND NOLTE
ATTORNEYS

United States Patent Office 3,264,504
Patented August 2, 1966

3,264,504
ELECTRICAL GENERATOR AND DEVICES FOR SUPPLYING ELECTRIC CURRENT TO LIGHTING, AIR-CONDITIONING AND OTHER APPARATUS
Paul Lamorlette, Paris, France, assignor to L'Eclairage des Vehicules sur Rail, Paris, France, a corporation of France
Filed June 2, 1961, Ser No. 114,516
Claims priority, application France, June 15, 1960, RB 830,110
24 Claims. (Cl. 310—168)

The present invention has essentially for its object to provide an electrical generator and devices for supplying electric current to lighting apparatus, air-conditioning plants or like installations utilizing one or more generators according to this invention, and provided with means for regulating the load current.

The generator according to this invention is a variable reluctance type induction generator for producing single and multiphase alternating currents, of the type comprising a rotor formed with radial teeth separated by polar gaps and a stator of which the poles comprise parallel notches for receiving induced current windings. It is known that in hitherto known homopolar generators, which are alternators of the variable reluctance type, the armature or rotor comprises a layout including straight-sided teeth which is attended by the existence of a certain residual magnetic flux in the rotor teeth gaps, whereas the residual flux should normally be reduced to zero in a machine operating under normal conditions. Moreover, the magnitude of the armature reactance, that is, the excess of field current to be delivered to the main magnetic circuit for obtaining an appreciable output from the armature winding reduces strongly the practical value of machines of this type which, on the other hand, suffer from the inconvenience of an excessive weight.

The variable reluctance type induction generator according to this invention is practically free from these inconveniences. It is remarkable notably in that each of the rotor teeth is provided on each one of its lateral faces with a cavity or the like extending in a direction parallel with the rotor axis, in order to reduce practically to zero the induction across the stator elements registering with the rotor polar gaps.

According to another feature characterizing this invention the cavities formed on the two lateral faces of a same rotor tooth are disposed symmetrically and are such that their maximum depth lies in the vicinity of the outer peripheral face of said tooth.

According to a further feature characterizing this invention, the slots formed in the stator poles for receiving the armature windings are such that the areas of the solid sections available for the magnetic flux exceed slightly one-half of the total section, that is, the cross-sectional area of the slots receiving the armature conductors.

According to another feature characterizing this invention, in the case of multiphase generators each stator pole is provided, in addition to the main field winding, with an auxiliary field winding, these windings being interconnected in series through the medium of rectifier elements adapted to conduct the current in a direction such that said windings be short-circuited when the direction of the current induced therein by the rotary magnetic field is the same as that the current flowing through the main field winding.

This invention is also concerned with devices for supplying current to lighting apparatus, air-conditioning plants or like installations utilizing one or more generators of the type broadly set forth hereinabove, said devices comprising members for regulating the load current and being remarkable notably in that the circuit for feeding the rectifier unit delivering the energizing or field current to said generator or generators and connected across the phases of the generator or of one of the generators according to the method already known per se, comprises a current limiter provided with control means responsive to the voltage and strength of the load current, in order to automatically reduce the current delivered by the generator or generators.

According to another feature of this invention, the aforesaid limiter consists of a magnetic amplifier provided with a first control winding through which a current of a strength consistent with the voltage of the load current is caused to flow, and with a second control winding through which a current of a strength consistent with that of said load current is also caused to flow, the feed circuit of said second control winding being connected, according to the method already known per se, across the terminals of a bridge mounted in the load circuit.

According to a further feature characterizing this invention, the circuit for energizing the first aforesaid control winding is connected with a voltage detector, for example of electronic character, adapted to deliver a signal through said winding when the voltage of the load current departs from a predetermined value.

Thus, it will be readily understood that the generator according to this invention possesses all the advantages of homopolar machines, absence of rotary windings, sliprings, brushes and commutators, greater constructional simplicity, without their inconveniences (high weight, high armature reactance) and that with the supply devices according to this invention it is possible to obtain constant load characteristics irrespective of the generator speed (which may be variable from a very low value to a very high value), the nature and magnitude of the load. Moreover, due to the fact that these devices are completely of static character, they require no maintenance and are characterized by a considerable resistance to shocks and vibration. The characteristics and properties set forth hereinabove are particularly appreciated in the case of vehicles for transporting passengers and goods, notably railway rolling stock (for applications such as lighting and air-conditioning or the like), wherein, as a rule, each vehicle has a separate equipment comprising a generator mounted on a bogie or truck and constantly driven from an axle through a V-belt and pulley transmission, for example.

Other features of this invention will appear as the following description proceeds with reference to the accompanying drawings, wherein.

Figure 1:
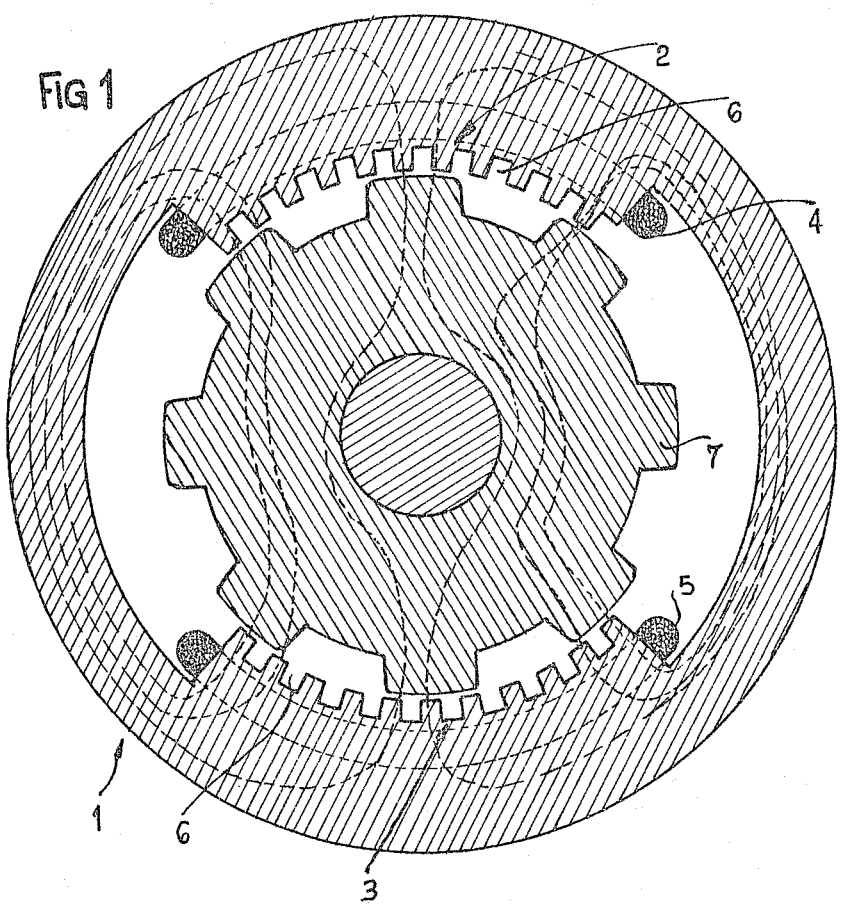
FIGURE 1 is a cross-sectional view showing a typical form of embodiment of a conventional-type homopolar generator.
Figure 2:
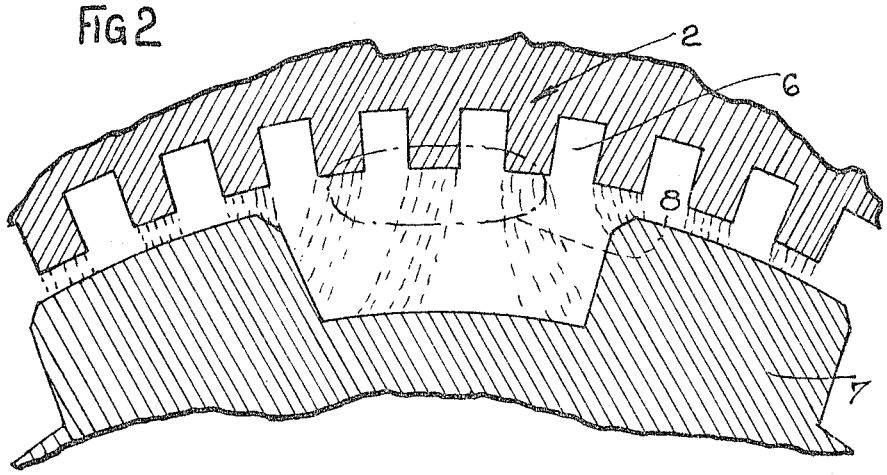
FIGURE 2 is a fragmentary cross-sectional view showing on a larger scale details of a conventional-type homopolar machine.
Figure 3:
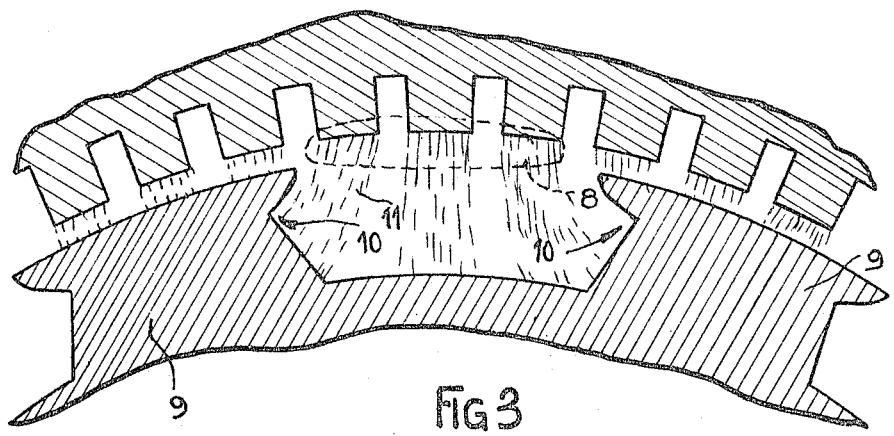
FIGURE 3 illustrates diagramamtically in cross-section a fragmentary view of a variable reluctance type induction machine constructed according to the teachings of this invention.

Referring first to FIGURE 1, the reference numeral 1 designates the stator of a conventional-type homopolar machine comprising a north pole 2 and a south pole 3. Each pole is surrounded by energizing or field windings 4 and 5 connected in series. When the energizing direct current flows through these field windings, a magnetic flux builds up which circulates in the machine approximately along the path shown in broken lines. Moreover, the north and south poles are formed on their cylindrical concave faces with longitudinal parallel grooves or notches 6 in which the armature windings are located. The rotor 7 has substantially the configuration of a notched or toothed wheel or drum. It will be seen that according to the principle of the variable-reluctance alternators the rotation of the rotor 7 is attended by a variation in the flux in which are immersed each of the armature conductors, since the main magnetic flux passes preferably through the rotor poles and very moderately, if not at all, through the gaps between the rotary poles. The E.M.F. generated is therefore proportional to the difference between the induction before a rotor tooth and the induction before an interval or gap between adjacent rotor teeth. As the permeability of air is not zero, flux will nevertheless flow across the polar gap and the E.M.F. collected on the armature windings is actually lower than the E.M.F. that could be expected considering the fact that the induction in front of the polar gaps is zero. The rotor teeth of this conventional homopolar machine have a straight-sided contour whereby a certain amount of residual flux will subsist in the zone 8 across the teeth interval (FIGURE 2). In the generator according to this invention, the rotor poles 9 (FIGURE 3) are so shaped that the induction in the polar gap is practically zero for the normal ampere-turn values obtained during the operation of the machine, that is, those ampere-turn values at which the threshold of saturation of the edges of poles 9 may be approached. To this end, the transverse contour of these poles 9 comprises on each one of its two lateral faces a hollow or concave portion 10 of which the bottom lies in the vicinity of the peripheral face of the head of the rotor tooth, the contour of this concave portion being designed with a view to so increase the length of the insulation distance lines 11 that the induction in the zone 8 be practically zero for a normal magnetic excitation field. On the other hand, it may be noted that the smaller the number of armature winding turns, the lower the induced current reactance. However, it is proved that the power output is maximum when the cross-sectional areas devoted to the iron and to the induced current winding turns respectively are substantially equal to each other. To take due account of the requirement of reducing the armature reactance, experience teaches that it is advisable to overstep slightly the optimum power value by giving a greater section to the iron than to the slots. As in this case the power available is close to the maximum value, this difference produces a slight loss of power but on the other hand it decreases appreciably the armature reactance. Therefore, in generators constructed according to the teachings of this invention the stator slots are so distributed that there is one slot per rotary pole and per phase, the area provided for the magnetic flux exceeding slightly one-half of the total area available. In a machine according to this invention it is also attempted to reduce the armature reactance by utilizing this reactance proper for its actual compensation. As a matter of fact, it is known that the circulation of three-phase A.C. for example in the armature winding causes a known phenomenon, that is, the production of a rotary field which will superpose itself on the continuous field created by the excitation. This rotary field appears in two different ways:

(1) It creates an extra demand for main ampere-turns, since the disposition of this field with respect to the rotor teeth is such as to reinforce the induction field when the flux encircled by an armature turn decreases and to reduce the resultant field when the flux encircled by the armature turn increases; to obtain an equal flux discrepancy it is therefore necessary to reinforce the main flux.

Figure 4:
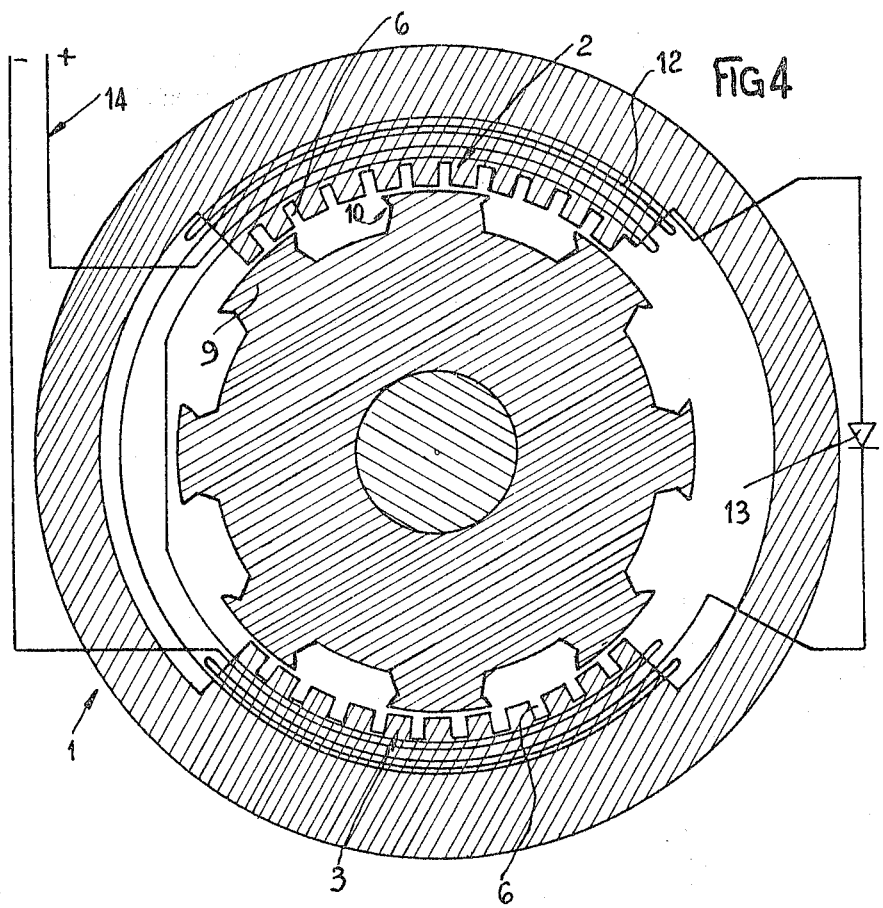
FIGURE 4 illustrates diagrammatically in cross-section a variable reluctance type induction generator constructed according to this invention.
Figure 5:
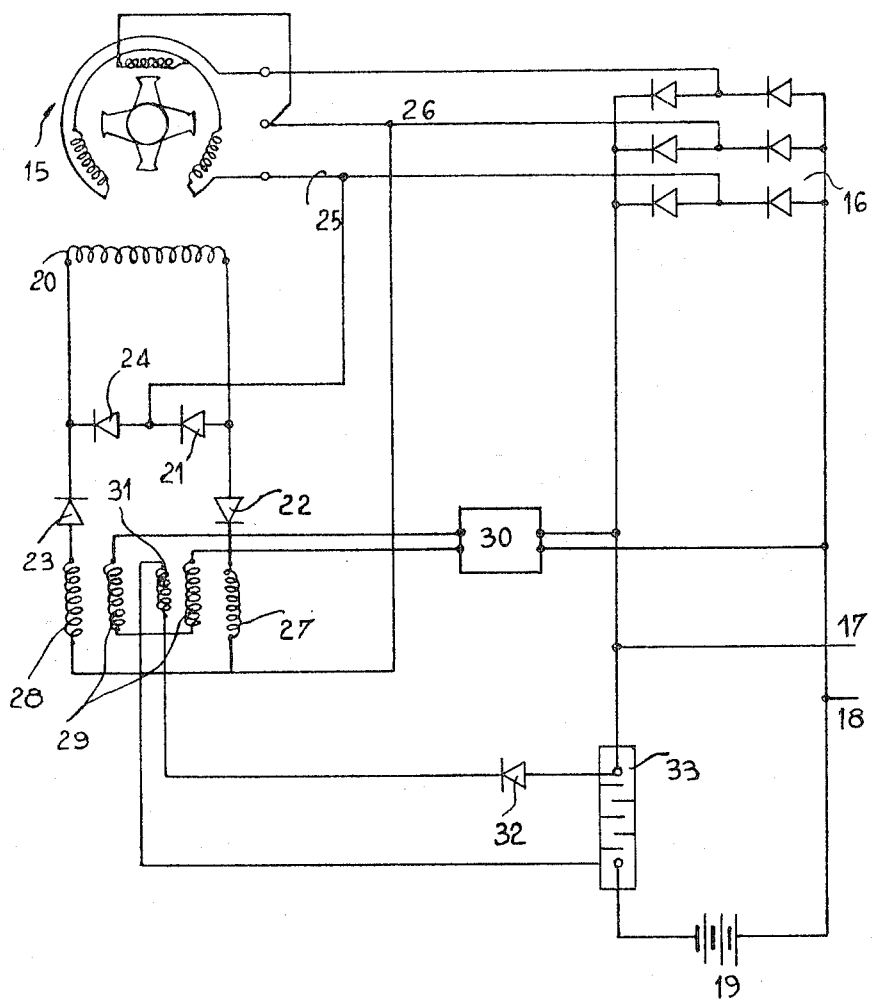
FIGURE 5 is a wiring diagram illustrating a typical form of embodiment of the current-supplying system of this invention.

(2) The thus produced rotary field causes an alternating field to develop from the turns of the field windings. When the generator delivers current, a substantial voltage pulsation appears immediately in the field windings and under these conditions it is no more possible to consider the field windings as constituting a passive circuit for they actually constitute a circuit comprising an alternating E.M.F. proportional to the output of the machine. This pulsatory voltage, which might have been an inconvenience, becomes an advantage when it is used for compensating the armature reactance, due to the provision of rectifier cells or the like according to the wiring diagram of FIGURE 4. The generator comprises an additional field winding 12 closed on itself through the medium of a rectifier element 13 (for example a diode, a semi-conductor, electron tubes or the like). The turn consisting of this winding is short-circuited only when the current is produced in a proper direction with respect to the main field current in the induction circuit 14. When the generator ceases from delivering current, and in the absence of any armature reactance pulsation, the winding 12 is not the seat of any current, or the current built up therein is only a very slight stray current due to the harmonics resulting from the movement of the rotor teeth past the stator poles. When currents being delivered by the armature winding, the flux pulsation commences and causes an extra current to appear which reinforces the main excitation field just when this reinforcement is effective and necessary since there actually is a demand for a greater excitation. Thus, it will be seen that this combination of properly distributed stator sectional areas with a properly utilized stray pulsatory voltage makes it possible to reduce considerably the armature rectance and to obtain a power output very close to the maximum. These substantial improvements are particularly evidenced in combination with the devices for regulating the field circuit, also constituting the subject matter of this invention and designed for maintaining to a constant value either the voltage or the strength of the current, irrespective of velocity of rotation of the generator, the magnitude of the load (for example the number of "ON" lamps) or the degree of charge of the storage battery acting as a buffer. This regulation, which requires the proper adjustment of the field current, may be established in accordance with the exemplary form of embodiment illustrated in FIGURE 5 of the drawings. In this example, the generator 15 produces three-phase A.C. converted into D.C. by means of a static power rectifier or like device 16 constituted by rectifier cells connected to form a three-hexaphased Graetz bridge which is a currently used arrangement, its primary advantage residing in the fact that its output voltage is very moderately pulsated. The D.C. delivered by the rectifier 16 is fed to the terminals 17, 18 of a load circuit (for example light lamps or the like) as well as to the terminals of a storage battery 19 acting as a buffer. The rectifier 16 serves at the same time the purpose of protecting the generator 15 against current feedbacks from the storage battery 19; thus, any line-breaker or current return relay of any kind may be dispensed with in this installation. The voltage and current are controlled by means of a static regulator comprising a magnetic amplifier and a voltage detector for example of electronic character. This regulation device is therefore free of any movable member, relay, vacuum tube or gas-filled tube, iron-hydrogen tube or like element. The inductor, shown in the form of a field winding 20, is fed with current through rectifier cells 21 to 24 from the phases 25, 26 and also through a magnetic amplifier 27, 28. The aforesaid rectifier cells may consist if desired of diodes, semi-conductors or the like. More particularly, it will be noted that the self-excitation of the machine will break automatically the supply of current to the field windings during stops while permitting the introduction of a regulating member before the excitation rectifier, that is on the alternating side. As a matter of fact, it is easier to control an A.C. than a D.C. due to the use of magnetic amplifiers of which the power consumption is considerably lower than the power released or blocked by the amplifier. With these various arrangements it will be readily understood by anybody conversant with the art that it is no more necessary to provide two field windings, one for the self-compensation of the induced current reactance and the other for the main excitation, for it will be appreciated that the main field winding 20, due to the provision of the pair of diodes 21 and 24, will constantly remain short-circuited for a given direction of flow of the current. Therefore, the induced reaction pulsation will be effective without necessitating the provision of a special additional winding. The magnetic amplifier 27, 28 comprises a first control winding 29 connected as a branch circuit to the terminals of the D.C. load circuit through the medium of a voltage detector 30. Thus, a current of which the strength is a function of the load voltage will flow through the control winding 29. The amplifier 27, 28 also comprises a second control winding 31 of which the feed circuit includes a diode 32 and is connected—in the manner already known per se—with the terminals of a branch circuit 33 mounted in the load circuit. The control winding 31 will thus receive a current of which the strength is a function of that of the load current. When the current delivered by the D.C. load circuit is low, the direct voltage drop effect in the diode 32 will prevent any current from flowing through the control winding 31. If the strength of the D.C. increases, for example, the voltage will also increase across the terminals of the branch circuit 33 and above a certain threshold the diode 32 allows the current to pass and this current, through the properly oriented winding 31, causes a reduction in the excitation of the magnetic amplifier and consequently a reduction in the resultant main field current (due to the variation in reactance). As a result, the current delivered by the machine is reduced automatically. The voltage detector 30 serves the purpose of measuring the voltage across the terminals of the storage battery 19 and of the load circuit 17, 18, and also to control the excitation magnetic amplifier by delivering an amplifier error signal through the winding 29 in the form of a low-power D.C. when this measured voltage departs from a predetermined fixed value. Thus, the magnetic amplifier will control the current under the direction and the dependance of the voltage detector.

Figure 6:
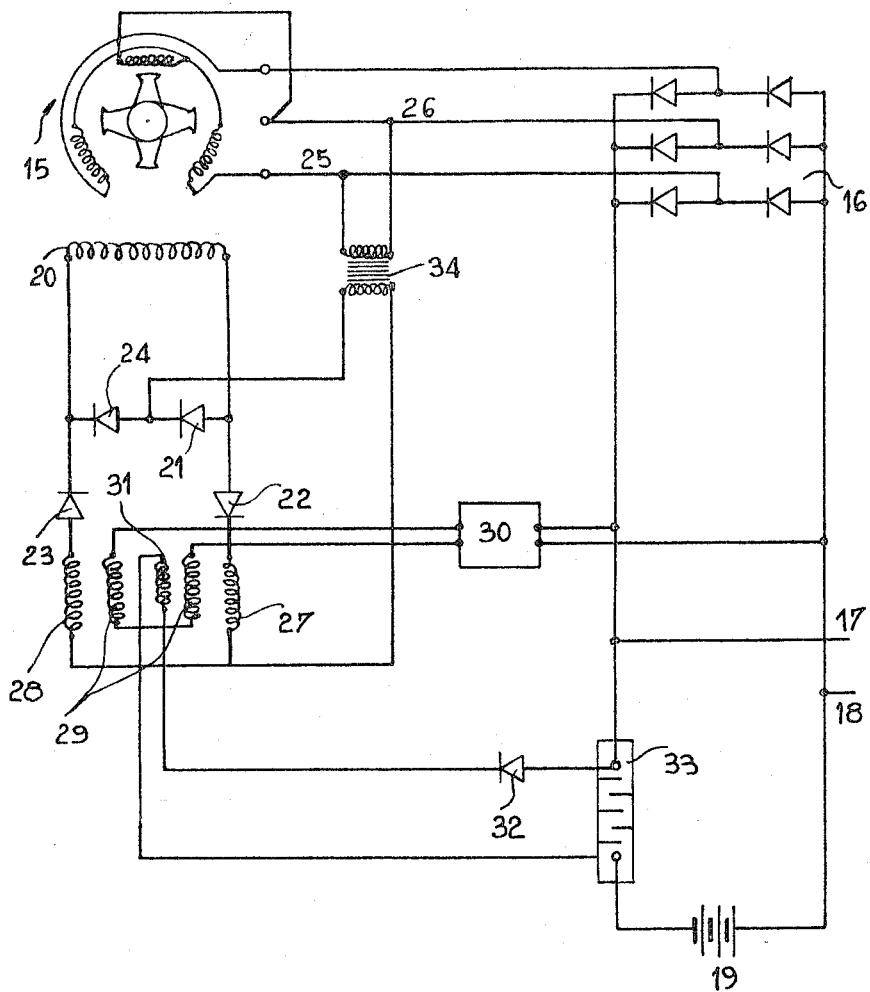
FIGURE 6 illustrates another wiring diagram of a modified embodiment of this system.

In certain cases it may be interesting to supply the field winding 20 with a voltage differing from that delivered by the generator proper. FIGURE 6 illustrates a modified embodiment of the device of FIGURE 5, wherein a transformer 34 (which may be of any known and suitable type and consist notably and for example of an autotransformer) is inserted in the circuit for energizing the winding 20.

Under these conditions, it will be seen that the same voltage may be fed to the field circuit irrespective of the generator voltage, the latter varying for example according to the type of circuit with which the generator is associated. Since on the other hand the capacity of generators of this type is adapted to be modified by varying the stack length of the magnetic circuit, it is possible to maintain the same number of turns in the field windings 20; as a result, the strength of the field current will remain unchanged irrespective of the capacity and voltage of these machines, so that the same excitation diodes 21, 22, 23 and 25 and the same magnetic amplifier 27, 28 with the same control windings 29, 31 may be used in all circumstances. Thus, the possibility of maintaining the same excitation components affords a substantial simplification in the supply, development, manufacture and control of the apparatus. Thus, it is possible to switch from one capacity to another by simply changing the adjustment of the voltage detector 30.

According to one form of embodiment, the voltage detector may advantageously consist of an electron unit comprising one or more transistors. As a matter of fact, for measuring the voltage of the storage battery this member is constantly connected therewith. Therefore, it will constantly absorb a very small current and it is well to keep this current to a particularly low value to prevent it from discharging the storage battery during long stops. By using the electron amplification this current may be reduced to a few milliamperes, that is, a value quite smaller than the natural capacity losses of storage batteries.

The transistors of the electronic voltage detector are connected with the control winding 29 through their emitter-collector terminals and with the load circuit through their emitter-base terminals.

The magnetic amplifier and the voltage detector may be of sturdy, rough construction and housed preferably in plastic or like cases to facilitate their replacement if necessary.

Of course, this invention is not limited to the forms of embodiment described and shown herein which are given solely by way of example and should not be construed as limiting the present invention, since many modifications and alterations may be brought thereto without departing from the spirit and scope of the invention as set forth in the appended claims.

What I claim is:

1. An electric variable reluctance type induction generator for producing alternative currents, comprising a stator; pole shoes on said stator provided with substantially parallel slots; armature windings bedded in said slots; main field D.C. windings carried by said pole shoes; and a rotor coaxially revolving within said stator and having radial polar teeth spaced by polar gaps, each rotor tooth being formed on either side face thereof with an angular substantially straight-sided, draft edged recess coextensive with the tooth face width in a direction substantially parallel with the rotor axis, both recesses being arranged in symmetrical relation to each other thereby defining a circumferentially enlarged polar tooth tip portion provided with a pair of sharp-edged sidewise projecting pole-horns overhanging in each circumferential direction a pair of reentrant dihedral-shaped tooth flanks respectively which diverge towards the tooth root and the dihedral draft edges of which are located relatively close to the radially outer peripheral tip face of said tooth.

2. A generator according to claim 1 comprising one stator slot per rotary pole and per current phase and wherein said slots are of such a size that the area of the solid sections devoted to the magnetic flux slightly exceeds one-half of the aggregate area available, that is, the cross-sectional area of said slots receiving the armature conductors.

3. A generator according to claim 2 for producing polyphase A.C., and further comprising an auxiliary excitation coil provided on each one of said stator pole shoes in addition to said main field winding, said excitation coils being interconnected in series to form a unidirectional shortcircuited loop closed on itself; and rectifier means inserted in series in said loop and biased to conduct the current in such a direction only as to produce an additional magnetic field reinforcing the main field, said loop being solely energizable by the armature reaction field.

4. A generator according to claim 1 for producing multiphase A.C. wherein each of said stator pole shoes is provided in addition to said main field winding with an auxiliary unidirectional excitation winding solely energized by the armature reaction field, said auxiliary unidirectional excitation windings being interconnected in series by means of at least one rectifier element adapted to conduct the current in such a direction that said auxiliary excitation windings are short-circuited when the direction of flow of the current induced therein by the rotary magnetic field is the same as the direction of the current flowing through said main field winding.

5. A generator according to claim 4 wherein said rectifier elements consist of diodes.

6. A generator according to claim 4 wherein said rectifier elements consist of sem-conductors.

7. A generator according to claim 4 wherein said rectifier elements consist of electron tubes.

8. A variable reluctance type induction generator consisting of a stator provided with pole shoes fitted with field windings and formed with parallel slots of such a size that the area of the solid sections devoted to the magnetic flux slightly exceeds one-half of the aggregate area available, or armature windings bedded in said slots and provided with output phase lines, respectively which are connected to a load circuit, and of a rotor provided with radial polar teeth each of which is formed on both lateral faces thereof with symmetrically disposed longitudinal recesses the loci of maximum depth of which are relatively close to the outer peripheral face of said tooth, a rectifier unit connected to said field windings for supplying the field current to said generator, a circuit feeding said rectifier unit and connected across at least two output phase lines of said generator, and a current-limiting means connected to said field windings and provided with control means connected to said load circuit and responsive to the voltage and strength of the load current in order to automatically limit the current delivered by the generator.

9. A generator according to claim 8, wherein said current-limiting means consists of a magnetic amplifier provided with a first control winding fed by a circuit through which a current is caused to flow, the strength of said current being subordinate to the voltage of said load current, and with a second control winding energized through a feeding circuit by a current of which the strength is a function of that of said load current, a shunt is inserted in said load circuit, said feeding circuit of said second control winding being connected across the terminals of said shunt.

10. A generator according to claim 9 wherein said circuit for energizing said first control winding is connected with a voltage detecting apparatus adapted to deliver a signal through said winding when the voltage of said load current departs from a predetermined value.

11. A generator according to claim 10 wherein said voltage detecting apparatus is an electronic device.

12. A generator according to claim 10 wherein there is provided in said feeding circuit energizing said second control winding a control member adapted to break the flow of current when the voltage across the terminals of said shunt is lower than a predetermined value.

13. A generator according to claim 12 wherein said control member consists of a diode mounted in series in said second control winding feeding circuit.

14. A generator according to claim 8 wherein said circuit supplying current to said field windings comprises a transformer which is of the autotransformer type.

15. An electrical variable reluctance type induction generator for producing alternative currents comprising a stator, pole shoes on said stator formed with parallel slots, armature windings bedded in said slots and provided with output phase lines, respectively, which are connected to a load circuit, main excitation field windings provided on said pole shoes, a rotor adapted to revolve coaxially within said stator and having its periphery formed with polar teeth spaced by interpolar gaps, means provided on said rotor teeth for mitigating the induction at each stator pole shoe portion located in front of said rotor interpolar gaps, means provided on said stator to compensate for the armature reactance, and load responsive, static feedback control means connected to said main excitation field windings and to said load circuit for self-regulating the output current and voltage.

16. A generator according to claim 15 wherein said reactance compensating means comprise at least one self-compensating excitation winding closed through at least one rectifier element for unidirectionally short-circuiting said self-compensating excitation winding so as to produce an additional magnetic field reinforcing the main excitation field.

17. A generator according to claim 16 wherein said self-compensating excitation winding is distinct from said main excitation field windings and consists of auxiliary excitation coils provided on said stator poles respectively and connected in series through at least one aforesaid rectifier element so as to form a closed loop.

18. A generator according to claim 16 wherein said self-compensating excitation winding is merged into said main excitation field winding which comprises a loop closed on itself through at least one of said rectifier elements.

19. A generator according to claim 18 comprising said rotor teeth each of which is formed on either side thereof with a recess co-extensive with the tooth parallel to the axis of said rotor and of such a shape that the locus of its maximum depth be relatively close to the radially outer peripheral face of said tooth, both recesses of a same tooth being symmetrically disposed and forming said means provided on said teeth, one stator slot per rotary pole and per phase, said slots being of such a size that the area of the solid sections devoted to the magnetic flux slightly exceeds one-half of the aggregate area available, rectifier means connected to the output phases of the generator and having a pair of D.C. output lines, a branch circuit connected across two output phases of said generator and including at least one rectifier bridge connected to said main field winding for feeding same and a magnetic amplifier, and a shunt inserted in series in one of said D.C. output lines, said magnetic amplifier having at least one first control winding connected across said D.C. output lines through the medium of a voltage sensing device and at least one second control winding connected across the terminals of said shunt in series with a control member, said control member being adapted to cut off said second control winding when the voltage across the terminals of said shunt is below a predetermined value.

20. An electric variable reluctance type induction generator for producing alternative currents in an output load circuit, comprising a stator having pole shoes provided with substantially parallel slots; armature windings bedded in said slots; main field D.C. windings carried by said pole shoes; a rotor coaxially revolving within said stator and having flaired radial polar teeth spaced by polar gaps, each one of said rotor teeth being formed on either flank thereof with a recess co-extensive with the tooth face width in a direction substantially parallel with the rotor axis, said stator being formed with one slot per rotary pole and per current phase and said slots being of such a size that the area of the solid sections devoted to the magnetic flux slightly exceeds one-half of the aggregate area available; and at least one unidirectional armature reaction self-compensating excitation winding located on the stator pole shoes and solely energized by the armature reaction field and closed on itself through rectifier means of short-circuiting said excitation winding in such a single direction as to produce an additional magnetic field reinforcing the main field.

21. A generator according to claim 20, wherein said rectifier means consists of at least one diode.

22. A generator according to claim 20 wherein said rectifier means consist of at least one semi-conductor element.

23. A generator according to claim 20, wherein said rectifier means consist of at least one electron tube valve.

24. A generator according to claim 20, wherein both recesses of each rotor tooth are arranged in symmetrical relationship and are of such a shape that the locus of their greatest flank penetration depth, corresponding to the least circular thickness of said tooth, is relatively close to the radially outer peripheral tip face of said tooth.

(References on following page)

References Cited by the Examiner

UNITED STATES PATENTS

| | | | |
|---|---|---|---|
| 1,659,729 | 2/1928 | Gannett | 310—168 |
| 2,380,966 | 8/1947 | Iden | 310—168 |
| 2,449,506 | 9/1948 | Pollard | 310—269 |
| 2,877,404 | 3/1959 | Zenner et al. | 322—25 |
| 2,958,034 | 10/1960 | Hobbs | 322—25 |
| 3,041,486 | 6/1962 | Moffitt | 310—168 |

FOREIGN PATENTS

| | | |
|---|---|---|
| 153,752 | 7/1938 | Austria. |
| 539,352 | 2/1956 | Italy. |

ORIS L. RADER, *Primary Examiner.*

MILTON O. HIRSHFIELD, *Examiner.*

G. SIMMONS, *Assistant Examiner.*